RESONANT TRANSFER CIRCUITS AND FILTERS THEREFOR
Filed Nov. 16, 1964

United States Patent Office 3,325,735
Patented June 13, 1967

3,325,735

RESONANT TRANSFER CIRCUITS AND FILTERS THEREFOR

Alfred Leo Maria Fettweis, Mol, Belgium, assignor to International Standard Electric Corporation Filed Nov. 16, 1964, Ser. No. 411,338
Claims priority, application Belgium, Nov. 21, 1963, 640,226
13 Claims. (Cl. 325—38)

Figure 1:
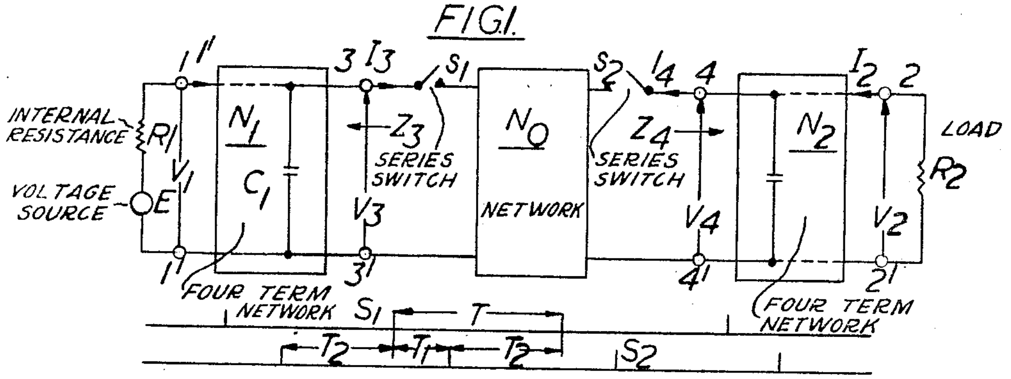

The invention concerns resonant transfer circuits and filters thereof.

Resonant transfer circuits are now well known and have been described for instance in the Proceedings of the Institute of Electrical Engineers (a British publication), September 1958, volume 105, part B, p. 449 etc., "Efficiency and reciprocity in pulse-amplitude modulation," K. W. Cattermole, as well as in the Post Office Electrical Engineering Journal (a British publication), volume 52, Part I, April 1959, p. 37 to 42, "An Efficient Electronic Switch—the Bothway Gate," J. A. T. French, D. J. Harding. Resonant transfer circuits offer the advantage that they permit a practically lossless sampling while previously, time division multiplex systems were such that sampling caused an appreciable attenuation of the signals, which had to be compensated by a corresponding amplification. Amplitude modulation by a signal of a pulse train having a sampling frequency F, gives rise to intermodulation products, this signal being found back in the various sidebands of the sampling frequency F and of its harmonics *n*F, where *n* is any integer. In general, the energy in the voice frequency band will be recovered with the help of a lowpass filter whose upper cut-off frequency does not exceed half the sampling frequency. In certain cases, however, one may be brought to recover the energy in one of the sidebands of the sampling frequency F or of its harmonics. This case may occur in particular in an electronic communication system using the time division multiplex principle such as described for instance in the U.S. Patent No. 3,204,033 (assigned to the assignee of this application) which uses the resonant transfer principle in a specific arrangement of time division multiplex highways. With such a system for instance, for the junctions interconnecting such an exchange to others, one may be led to translate the channels occupying a particular phase on the multiplex highways of the electronic exchange into different frequency bands on the junctions by using this time the frequency division multiplex principle, i.e. a carrier transmission system. In general, on condition that the bandpass filters are suitably designed, one may in this way transfer a signal band from one frequency domain to the other by using the resonant transfer principle.

An object of the present invention resides in the use and in the realization of bandpass filters allowing a transmission using the resonant transfer principle and which is particularly efficient.

In accordance with a characteristic of the invention, resonant transfer circuits are characterized by the fact that at least one of the filters intervening in a connection is of the double sideband type, its passband being centered on a particular harmonic *n*F of the sampling frequency F, and that in all the sidebands, the resistive part of its pulse impedance is substantially equal to double the input resistance offered by such a filter in its passband on the high frequency side, i.e. on the side of the gates or switches used in the resonant transfer, the said pulse impedance of the filter being defined as the sum of the various values of $Z(p+nP)$ for all the integral positive, negative and nil values of *n*, where $Z(p)$ is the input impedance of the filter, *p* the complex angular frequency and P the complex angular sampling frequency.

In accordance with another characteristic of the invention, the sum of the reactive parts of the pulse impedances of the two filters used at each end of a resonant transfer connection is substantially nil in the passbands.

In accordance with another characteristic of the invention, each of said reactive parts is substantially nil in the passbands.

In accordance with another characteristic of the invention, the resistive part of the pulse impedance of a filter associated to a double sideband filter through a resonant transfer circuit has a value equal to twice the input resistance of the double sideband filter in case said associated filter is of the single sideband type, and equal to said input resistance in case said associated filter is also of the double sideband type.

In this manner, all the advantages of the double sideband modulation system can be obtained together with an efficient transmission using the principles of the resonant transfer. The double sideband systems are particularly interesting for short haul. Namely, they offer the advantage that, from the filtering point of view, they permit economies to be realized. Indeed, if a voice frequency band, going from 300 to 3400 c./s., and carrier frequencies spaced by 5 kc./s. are considered in a single sideband system, there is only a band of 300+300=600 c./s. avaiable for the attentuation of the filter, necessary to avoid crossstalk, to reach a suitable value, while in a double sideband system, 1600+1600=3200 c./s. are available in order that the attenuation of the filter rises from the nil value to the value required for the attenuation of the undesirable frequencies. In the double sideband system, the suppression of the carrier also permits an energy economy. For the demodulation, it will be sufficient to provide appropriate means permitting to add the voltages coming from the two sidebands with a suitable relative phase. Such demodulation systems are well known and starting from the two sidebands, they deduce the required information for the correct phase setting. By means of this information, a local carrier may eventually be produced, suitably synchronized and locked in phase.

A double sideband modulation system with suppression of the carrier wave, and comprising means permitting to recreate the latter for the demodulation, is in particular described in the U.S. Patent No. 2,979,611 which is assigned to the assignee of this application.

Means enabling filters for resonant transfer circuits to be obtained with a substantially flat transmission in the passband have been described in a concurrent U.S. application Ser. No. 213,375 filed July 30, 1962 and assigned to the assignee of this invention. According to this method, it becomes possible to realize a transmission which is substantially perfect by using resonant transfer circuits with filters whose cut-off frequency does not coincide with half the sampling frequency. In the first article mentioned above, it has indeed been shown that a perfect transmission could be obtained in the resonant transfer system when the filter fulfilled such a condition. In practice, however, a bandpass filter must have its cut-off frequency somewhat below half the sampling frequency in order to permit a suitable attenuation of the undesirable frequencies by means of a filter comprising a number of elements which is as reduced as possible for the required performance.

Another object of the invention is to show the possibilities of application of a method for compensating filters such as described in the above mentioned concurrent U.S. application Ser. No. 213,375 to bandpass filters and to extend it to enable the realization of compensated bandpass filters whose passband does not correspond to a sideband of the sampling frequency or one of its harmonics or yet to a double sideband centered on one of these frequencies.

In accordance with another characteristic of the invention, bandpass filters for resonant transfer circuits have a first cut-off frequency located at a distance $f_{c'}$ from the sampling frequency F or one of its harmonics including zero frequency and a second cut-off frequency located at a distance $$f_c\left(\frac{F}{2}>f_c>f_{c'}\right)$$

from said harmonic or said sampling frequency and are realized as ideal open circuit filters on the high frequency side with the adjunction on this side of a series reactive branch, said series branch being capacitive at high frequency.

In accordance with another characteristic of the invention, said series branch comprises two capacitances and an inductance.

In accordance with yet another characteristic of the invention, said series branch comprises two capacitances and two inductances forming two distinct attenuation poles.

Indeed, it can be shown that in the case of a bandpass filter of the type considered above and which may correspond for instance to a voice frequency filter whose lower cut-off is caused by the action of a line transformer in a telephone circuit, that if this filter is an ideal open circuit filter with an input impedance on the high frequency side which is substantially constant and resistive in the passband, and nil outside the latter, it will present a pulse impedance which will have not only a resistive part substantially equal to the input resistance of the open circuit filter in the passband, but also a reactive part. This reactive part can be compensated by reactances of the same type as those already envisaged in the above mentioned U.S. patent application, with the distinction that these reactances must no longer be inductive at low frequency. In this manner, for the correction on the low frequency side of such a bandpass filter, the simplest circuit for the series reactance designed to correct the filter pulse impedance can be constituted by a simple capacitor, if one takes into account the fact that the cut-off frequency is relatively near zero frequency, e.g. 300 c./s. Otherwise, an approximation of the same order as that envisaged in the previously mentioned concurrent U.S. application, but at the two ends of the passband of the bandpass filters, can be obtained already with the help of two series anti-resonant circuits or any equivalent reactance arrangement.

Figure 2:
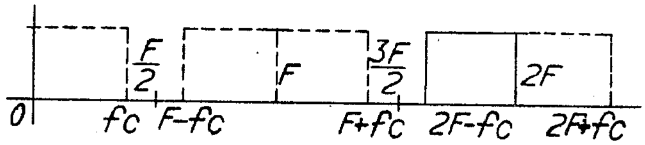
Figure 3:
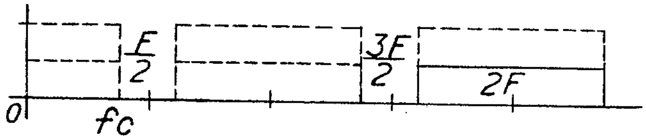
Figure 4:
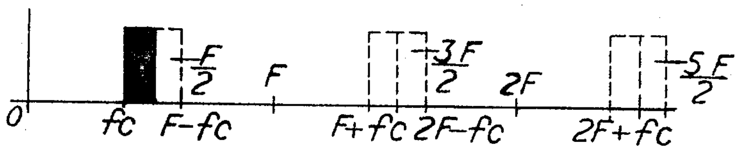
Figure 5:
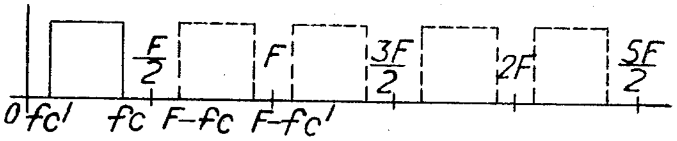
Figure 6:
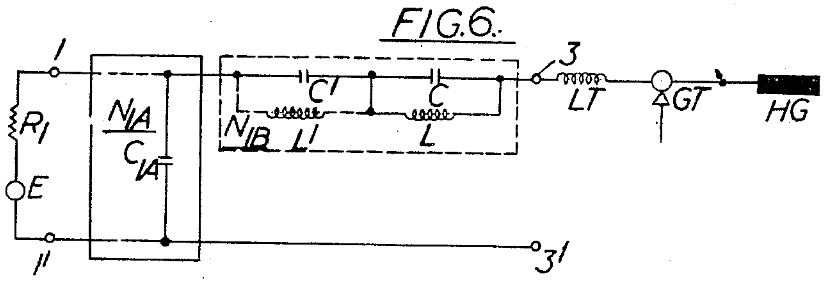

The above mentioned and other objects and features of the invention will become more apparent and the invention itself will be best understood by referring to the following description of the embodiments taken in conjunction with the accompanying drawings and which represent:

FIG. 1, a general diagram of a resonant transfer circuit including a diagram of the closure instants of the switches;

FIG. 2, a diagram of the resistive part of the pulse impedance of a bandpass filter constituted by the aggregate of dotted and full outlines, the latter describing the resistive part of the input impedance of the bandpass filter of which the pass-band corresponds to the lower side band of the second harmonic of the sampling frequency;

FIG. 3, a diagram analogous to that of FIG. 2 but covering the case of a bandpass filter according to the invention having a double sideband centered on the second harmonic of the sampling frequency;

FIG. 4, a diagram corresponding to that of FIG. 2 but relating to a bandpass filter according to the invention the upper cut-off frequency of which is equal to half the sampling frequency;

FIG. 5, a diagram corresponding to that of FIG. 2, but relating to a bandpass filter according to the invention the lower cut-off frequency of which is above zero frequency and the upper cut-off frequency is lower than half the sampling frequency and FIG. 6, a compensated bandpass filter according to the invention and intended for use in a multiplex time division system using the resonant transfer principle.

In FIG. 1, the blocks $N_1$ and $N_2$ are two 4-terminal networks which are not necessarily the same and which are assumed to comprise only constant elements. On the side of the pair of terminals 3–3′ for $N_1$ and on the side of the pair of terminals 4–4′ for $N_2$ these two constant parameter networks $N_1$ and $N_2$ are interconnected by means of series switches, $S_1$ on the side of $N_1$ and $S_2$ on the side of $N_2$, to a network $N_0$, also shown as a block and which in principle may comprise additional switches (not shown) which as $S_1$ and $S_2$ are operated periodically. At its other pair of terminals 1–1′, $N_1$ is fed by a voltage source $Ee^{pt}$ having an internal resistance $R_1$. This source is represented at FIG. 1 merely by its complex amplitude E, and the factor $e^{pt}$ characterizing the signal frequency, $p$ being the complex angular frequency and $t$ the time, is also omitted for all the other voltages (as well as for all the currents) identified in FIG. 1, i.e. $V_1(I_1)$ across terminals 1–1′, $V_3(I_3)$ across terminals 3–3′, $V_4(I_4)$ across terminals 4–4′ and $V_2(I_2)$ across terminals 2–2′ to which the load resistance $R_2$ is connected. The input impedance of $N_1$ on the side of terminals 3–3′, i.e. on the side of switch $S_1$ is designated by $Z_3$ and the corresponding impedance for the network $N_2$ across terminals 4–4′ is designated by $Z_4$. These impedances $Z_3$ and $Z_4$ are assumed to become those of the capacitances $C_1$ and $C_2$ when the frequency becomes sufficiently high. It follows therefrom that $C_1$ and $C_2$ represented inside the respective networks $N_1$ and $N_2$ by single shunt capacitors across terminals 3–3′ and 4–4′ respectively, although they may be composed by a plurality of capacitors included in $N_1$ and $N_2$, may be identified in terms of $Z_3$ and $Z_4$ which are respective functions of $p$ by $$C_1=\lim_{p\to\infty}\frac{1}{pZ_3(p)} \tag{1}$$

$$C_2=\lim_{p\to\infty}\frac{1}{pZ_4(p)} \tag{2}$$

The network $N_0$ forming the resonant transfer network and which in its simplest form may be constituted by a simple series inductance (not shown in FIG. 1) when the two energy storage devices are two capacitances such as $C_1$ and $C_2$ as shown, will be assumed to be such that the voltages across the terminals of the capacitances are sharply modified during the actual resonant transfer time, e.g. during the closure time of switch $S_1$ corresponding to capacitance $C_1$. This is obtained by a resonance phenomenon and in the case of direct resonant transfer with the switches $S_1$ and $S_2$ closed and opened simultaneously, as is well known, the resonant transfer time $t_1$ during which the switches are closed may be chosen equal to half the natural oscillation period of the circuit constituted by the inductance and the capacitances $C_1$, $C_2$ in series. If this transfer time $t_1$ is sufficiently small with respect to the repetition period T, it is justified to assume that any other current or voltage in the networks $N_1$ and $N_2$ remains practically unchanged during each of these short interconnecting times.

FIG. 1 also represents the times at which the switches $S_1$ and $S_2$ are operated. The recurrent period of the closure is the same for the two switches and is equal to T, but as shown in the timing diagram of FIG. 1, the switch $S_2$ is closed at times which lag by $T_1$ behind the closure times of switch $S_1$, or alternatively which lead such closure times by $T_2$ so that $T=T_1+T_2$.

This is a general timing diagram for the switches $S_1$ and $S_2$ and it corresponds in fact to a resonant transfer circuit using the intermediate storage principle also described for instance in the first article mentioned above and more particularly in paragraph (5.4). In a direct resonant transfer circuit, the closure times of the switches $S_1$ and $S_2$ will coincide so that one of the times such as $T_1$ will be equal to zero while $T_2$ will be equal to the repetition period. If intermediate storage is used however, the network $N_0$ may comprise additional reactive storage elements as well as additional switches.

All the voltages $V_1$, $V_2$, $V_3$ and $V_4$ are complex amplitudes which depend on the sampling frequency, the multiplication factor $e^{pt}$ having been omitted everywhere, this factor also affecting the input source shown in FIG. 1 of which only the amplitude E has been indicated. Thus considering $V_2$ which is used for the determination of a conversion coefficient defining the transmission between the terminals 1–1' and 2–2', this amplitude is a function of the time $t$, i.e.

$$V_2(t)=\sum_{n=-\infty}^{\infty} V_{2n}e^{nPt} \tag{3}$$

in which P is the sampling complex angular frequency. Current $I_2(t)$ may be defined exactly in the same way as $V_2(t)$ or in other words one may write $$V_{2n}=-I_{2n}R_2 \tag{4}$$

connecting the voltage component of order $n$ to the current component of same order.

A conversion coefficient or order $n$ may then be defined by analogy with the classical theory for networks with constant parameters. In the latter, the square of the modulus of the conversion coefficient may be defined as being the ratio between the energy in the load resistance, i.e. $R_2$, and the maximum power which may be obtained from source E.

As the first is equal to the square of the modulus of the voltage component $V_{2n}$ of order $n$ at the terminals of $R_2$ divided by this resistance, while the second is equal to the square of the modulus of E divided by $4R_1$, a conversion coefficient $S_{21n}$ of order $n$ characterizing the transmission from terminals 1–1' to terminals 2–2' may be defined by $$S_{21n}=2\frac{V_{2n}}{E}\frac{R_1}{R_2}=-2\frac{I_{2n}}{E}\sqrt{R_1R_2} \tag{5}$$

where the second expression is immediately obtained by a direct application of (4).

In the case of direct resonant transfer, i.e. when the switches $S_1$ and $S_2$ of FIG. 1 are closed and opened simultaneously, it may be shown that the conversion coefficient $S_{21n}$ defining the transmission for any sideband, according to the value of $n$, is identified by $$S_{21n}{}^2=\frac{4R_3(w)R_4\left(w+\frac{2\pi n}{T}\right)}{|Zp_3+Zp_4|^2} \tag{6}$$

giving the square of its modulo.

Such a derivation assumes in particular that the networks $N_1$ and $N_2$ being reactive, the resistive part $R_3$ of the input impedance $Z_3$ at the terminals 3–3' of $N_1$ is, in the passband, equal to $R_1$ multiplied by the square of the modulus of the open circuit voltage conversion coefficient of the network $N_1$ from terminals 1–1' to terminals 3–3' and that an analogous relation exists for the resistance $R_4$ of the input impedance $Z_4$ of $N_2$. In the above relation, it has been indicated that while $R_3$ is function of complex angular frequency $w$ of the input signal, $R_4$ is function of $$w+\frac{2\pi n}{T}$$

where T is the sampling period. Finally, $Z_{p3}$ and $Z_{p4}$ are the respective pulse impedances corresponding to the input impedances $Z_3$ and $Z_4$ of $N_1$ and of $N_2$. Consequently as already indicated in the concurrent U.S. application a pulse impedance such as $Z_3$ for instance may be written as $$Z_{p3}=\sum_{n=-\infty}^{\infty} Z_3(p+nP) \tag{7}$$

If the filter is a double sideband filter centered on the sampling frequency F or one of its harmonics, the moduli of the corresponding conversion coefficients, i.e., $S_{21n}$ and $S_{21,-n}$ must be equal and hence (6) leads to $$R_4\left(\frac{2\pi n}{T}+w\right)=R_4\left(\frac{2\pi n}{T}-w\right) \tag{8}$$

If it is desired that the transmission should be as perfect as possible, in order to obtain a maximum value for expression (6) the denominator of this expression should have a minimum value, i.e., minimum values should be given to the resistive and reactive parts of $Z_{p3}+Z_{p4}$. As these pulse impedances are defined in the manner indicated by (7), resistive components $R_{p3}$ and $R_{p4}$ of $Z_{p3}$ and $Z_{p4}$ can be defined by $$R_{p3}=\sum_{n=-\infty}^{\infty} R_3\left(w+\frac{2\pi n}{T}\right)\geq R_3(w) \tag{9}$$

$$R_{p4}=\sum_{n=-\infty}^{\infty} R^6\left(w+\frac{2\pi n}{T}\right)\geq 2R_4\left(\frac{2\pi n}{T}+w\right)=2R_4\left(\frac{2\pi n}{T}-w\right) \tag{10}$$

The minimum values indicates respectively for $R_{p3}$ and $P_{p4}$ core from the assumption that filter $N_1$ is a single sideband filter while filter $N_2$ is a double sideband filter. On the other hand, in order to render the reactive component of $Z_{p3}+Z_{p4}$ as small as possible one must have $$X_{p3}+X_{p4}=\sum_{n=-\infty}^{\infty} X_3\left(w+\frac{2\pi n}{T}\right)+X_4\left(w+\frac{2\pi n}{T}\right)=0 \tag{11}$$

In this case one may write $$|S_{21n}|^2=|S_{21,-n}|^2=\frac{4R_3(w)R_4\left(w+\frac{2\pi n}{T}\right)}{\left|R_3(w)+2R_4\left(w+\frac{2\pi n}{T}\right)\right|^2} \tag{12}$$

and this common expression becomes maximum if the relation $$R_3(w)=2R_4\left(\frac{2\pi n}{T}+w\right)=2R_4\left(\frac{2\pi n}{T}-w\right) \tag{13}$$

is satisfied. By replacing into (12) one finds $$|S_{21n}|^2=|S_{21,-n}|^2=\frac{1}{2} \tag{14}$$

which indicates that a perfect transmission may thus be obtained by using a double sideband filter for $N_2$. If the preceding prescriptions are satisfied and if in the whole passband of a filter such as $N_2$, the resistive part $R_{p3}$ of its pulse impedance is equal to twice its resistance, which is constant in the passband, a perfect transmission will be realized. It can also be proved that if the reactive components $X_{p3}$ and $X_{p4}$ of the pulse impedances of the two filters of FIG. 1 are each equal to zero and this in the passband, such a perfect transmission can be obtained not only in the case where the switches $S_1$ and $S_2$ of FIG. 1 are simultaneously closed for a direct resonant transfer but also when they are not simultaneously closed, and more particularly in the case of a resonant transfer by intermediate storage as described in particular in the first above mentioned article. This has a very special importance in telephone exchanges using the principle of time division multiplex, since it may be desirable that some communications established from any station should be realized in accordance with the principle of the direct resonant transfer while others should be routed following the principle of the intermediate storage. If the filters such as $N_1$ and $N_2$ in FIG. 1 are ideal open circuit filters, i.e., filters whose input impedance such as $Z_3$ for $N_1$ is of the minimum reactance type and such that their open circuits voltage transfer coefficients have a constant value in the passband and is nil outside the latter, a relation can be established between the imaginary parts $X_{p3}$ of the pulse impedance of the filter and the resistive part such as $R_{p3}$. In this case indeed, the input resistance such as $R_3$ is equal to $R_1$ in the passband and is nil outside the latter.

Hence, the resistive component $R_3$ of an impedance such as $Z_3$ being known, its reactive component $X_3$ can be calculated from Bode's relation between the real and imaginary parts of an impedance. (See "Network Analysis and Feedback Amplifier Design" by H. W. Bode, published by D. Van Nostrand Co., Inc., 1945.) Then, the reactive part of the corresponding pulse impedance, i.e., $X_{p3}$ can be calculated, for instance from the infinite series intervening in (11). By using the analogous series for the resistive component, i.e., $R_{p3}$ (9), of the pulse impedance in the case of a passband or low-pass filter of which one cut-off frequency corresponds to the sampling frequency F or one of its multiples, while the passband has a width of $f_c$, it may be seen that if $R_3$ is constant in this passband and equal to zero outside, this resistive part $R_{p3}$ of the corresponding pulse impedance will be equal to this constant value in all the sidebands and will be zero outside. It can also be shown that for any impedance such as the input impedance of $N_1$, i.e., $Z_3$, which is an analytic function of the complex angular frequency $p$ or yet, of the normalized variable $pT/2$ where T is the sampling period, the corresponding pulse impedance such as $Z_{p3}$ is then a function of the transformed variable $$\tanh \frac{pT}{2}$$

In this case, if $Z_3$ is of the minimum reactance type, $Z_{p3}$ is also of this type in such a way that if for instance the characteristic of $R_{p3}$ is known, as in the above case, the reactive part $X_{p3}$ is computed in the same way in the domain of the variable $$\tanh \frac{pT}{2}$$

as the reactive part $X_3$ is computed in the domain of the normalized variable $pT/2$ which is directly proportional to frequency.

From all this it ensues that the compensation theory for the reactive part of the pulse impedance of a filter in its passband and outlined in the above mentioned concurrent U.S. application is also applicable to bandpass filters of the above mentioned type.

FIG. 2 represents the resistive component of a pulse impedance of such a bandpass filter. It has been assumed in FIG. 2 that the passband of the filter extends from $2F-f_c$ to 2F. On the diagram, the dotted outline plus the full outline represent (shown for part of the frequency range) the characteristic of the resistive component of the pulse impedance, while the full outline alone represents the resistive part of the corresponding impedance, the characteristic being indicated solely for positive values of the frequency $f$, in view of the symmetry of such a characteristic about the origin. By using the series such as (9) and (10), it can be shown that the characteristic of FIG. 2 for the resistive part of the pulse impedance remains the same whatever be the passband of the filter.

FIG. 3 represents a characteristic analogous to that of FIG. 2, but corresponding to the case where the pass band of the filter is of the double sideband type centered around the sampling frequency F or one of its harmonics, and as represented in this figure, the pass band, corresponding to the full line characteristic, extends from $2F-f_c$ to $2F+f_c$. For a double sideband filter, in view of the relation such as (13), the normalized value of the resistance in the pass band becomes equal to one half if one wishes to obtain the same overall characteristic for the resistive part of the pulse impedance of such filters as that represented in FIG. 2 in the case of a single sideband filter. This characteristic is still independent of the position of the pass band.

By virtue of what precedes, for the double sideband filters such as characterized by FIG. 3, as well as for the bandpass filters such as characterized by FIG. 2, the pulse reactance may be written in the same way as indicated in the above mentioned concurrent U.S. application, i.e. as a normalized value with respect to the constant input resistance of the filter in the pass band:

$$-\frac{j}{\pi} \log_e \frac{1+b}{1-b} |b| < 1 \tag{15}$$

The above expression is valid in the pass band and is function of the transposed and normalized variable $b$ which is given by $$b = \frac{\tan \frac{wT}{2}}{\tan \frac{w_c T}{2}} = \frac{\tan \pi f T}{\tan \pi f_c T} \tag{16}$$

in which $w_c$ and $f_c$ represent the angular cut-off frequency and the cut-off frequency respectively. It will be recognized that the expressions (15) and (16) correspond respectively to the expressions (12″) and (15) given in the above mentioned concurrent U.S. application.

If it is desired to compensate such a reactive component (15) in the pass band of a filter such as characterized by FIG. 2 or FIG. 3, one may use the reactive networks such as defined in the above mentioned Belgian patent, i.e. those comprising one or several anti-resonant circuits to be placed in series with the input impedance of the filter such as $N_2$ on the open circuit side, i.e. on the side of the switch $S_2$. Indeed, it can be shown that there exist bandpass filters having a pulse impedance whose normalized characteristic is complementary with respect to unity with regard to that of filters such as defined on FIG. 2 or FIG. 3 and this at any frequency.

FIG. 4 represents the characteristic of the resistive part of the pulse impedance of such a filter, in the same manner as in FIG. 2. By way of example one has indicated a bandpass filter whose pass band extends from $f_c$ to $F/2$. The resistive part of the corresponding pulse impedance is equal to unity along frequency bands each having a width of $F-2f_c$, each of which being centered around an odd multiple of half the sampling frequency. In the same way as for FIGS. 2 and 3, it can be shown that the characteristic of the resistive part of the pulse impedance such as represented in FIG. 4 may be obtained whatever the position of the pass band of the filter considered may be, that is to say that the latter (input resistance outlined in full) may occupy either the lower sideband of an odd multiple of half the sampling frequency, e.g. $F/2$ as shown, or an upper sideband, or yet the two sidebands corresponding to one of the said odd multiples of half the sampling frequency. When the resistive part of the pulse impedance of the filters such as characterized by FIG. 4 is nil, the reactive part of their normalized pulse impedances is equal to the expression (15) but affected of a positive sign, which permits a perfect compensation. In practice, if one realizes a filter such as defined by the characteristic of FIG. 4 which the help of a simple anti-resonant circuit tuned to a frequency higher or lower than $F/2$, this anti-resonant circuit in series with the filter of the type defined by FIGS. 2 or 3 on the high frequency side will permit a suitable compensation of the reactive part of the pulse impedance in the pass band of the latter filter whatever the harmonic corresponding to the latter may be.

FIG. 5 represents how another type of bandpass filter than those discussed in relation to FIGS. 2 and 3 can be compensated in such a manner that the reactive part of its pulse impedance is rendered substantially zero in the pass band which ensures a perfect transmission. FIG. 5 represents, in the same manner as FIGS. 2 to 4, the characteristic of the resistive part of the pulse impedance related this time to a band-pass filter whose upper cut-off frequency is $f_c$ and whose lower cut-off frequency is $f_{c'}$, these two cut-off frequencies being both lower than half the sampling frequency. The pulse resistance is, as indicated in FIG. 5, equal to a constant value in all the sidebands based on the sampling frequency or one of its harmonics. This is true whatever the position of the pass band of the bandpass filter which may extend from $f_c'$ to $f_c$ from F or one of its harmonics.

The shown example is particularly interesting in the case of telephone systems using the time division multiplex principle and transmission circuits based upon the resonant transfer principle, since the telephone line circuits usually comprise a transformer which has a high-pass filter action, i.e. it is responsible for the cut-off frequency $f_{c'}$. By comparing the characteristic of FIG. 5 with that of FIGS. 4 and 2, it is seen that a perfect compensation may in principle be obtained if one adds the characteristics of FIGS. 2 and 4 to those of FIG. 5 on condition that the cut-off frequency $f_c$ of FIG. 2 becomes the cut-off frequency $f_{c'}$.

The reactive network corresponding to the filter characterized by FIGS. 2 and 3 can be realized in the form of a high-pass ladder structure beginning by shunt inductance followed by series capacitance, etc. If such a network is used as two-terminal reactive compensation network in the manner described in the above mentioned concurrent U.S. application, since it must present a capacitive impedance at high frequency, the number of reactive elements must be even which corresponds in particular to any number of anti-resonant circuits in series. In the case of FIG. 5 however, when a reactive two-terminal network corresponding to a filter characterized by the FIGS. 2 and 3 is used to correct a part of the characteristic of the pulse resistance, the compensating reactive two-terminal network may now also comprise an odd number of reactances.

Indeed, if one considers (15) which represents the reactance in the passband of the filters characterized by FIGS. 2 and 3 and if one replaces the transposed and normalized variable $b$ in this expression by $-1/b$, then one obtains the pulse impedance of filters characterized by FIG. 4 outside the pass band, this pulse impedance being purely reactive for these frequencies. In other words, a filter corresponding to FIG. 4 is obtained from a filter corresponding to FIGS. 2 and 3 by a transformation consisting in exchanging the inductances and the capacitances, i.e. a low-pass/high-pass transformation. Accordingly, to the ladder structure for the reactive two-terminal network corresponding to FIG. 4 and considered above, corresponds a low-pass ladder structure associated to the filters having the characteristics of FIGS. 2 and 3. This low-pass ladder structure will thus begin with a shunt capacitance followed by series inductance etc., in such a manner that this structure may comprise as well an odd number of elements as an even number since it will always be capacitive at high frequency. This means that for the compensation of a filter such as characterized by FIG. 5, one can use an anti-resonant circuit for the compensation on the side of the upper cut-off frequency $f_c$, while for the lower cut-off frequency $f_{c'}$, it would be possible to use a simple capacitor which would also be placed in series with the impedance of the uncorrected filter as for the anti-resonant circuit. In other words, the reactive two-terminal compensation network constituted by simple capacitors corresponds to the most elementary low-pass filter but which, as the single sideband or double sideband bandpass filters whose pulse resistances appear in FIGS. 2 and 3, can also produce a characteristic of the same type.

One may wonder if a simple capacitor will produce for the cut-off frequency $f_c$, a compensation which is as precise as that realized with the help of an anti-resonant circuit for the cut-off frequency $f_c$. In the case of the bandpass filter of FIG. 5, the answer is affirmative since it will generally concern a filter covering the voice frequency bandwidth, e.g. from 300 to 3400 c./sec. and such a bandpass filter has thus a very large bandwidth when the latter is expressed in octaves or corresponding units. It follows that if the characteristic of an anti-resonant circuit which resonates for instance at 3700 c./sec. may be found adequate to effect a correction of the filter response in the bandwidth extending from 3100 to 3400 c./sec., a simple capacitor which gives an infinite reactance at zero frequency instead of 3700 c./sec. for the anti-resonant circuit, can give a suitable approximation for the correction of the filter response in the zone from 300 to 600 c./sec. This approximate reasoning thus permits to verify that a simple capacitance will be as effective for the correction on the side of the cut-off frequency $f_{c'}$ as an anti-resonant circuit in the neighbourhood of the cut-off frequency $f_c$ and this when the cut-off frequency $f_{c'}$ is substantially nearer a multiple of the sampling frequency F, including zero frequency, than the cut-off frequency $f_c$ is near an odd multiple of half the sampling frequency.

The reasoning performed above for the bandpass filter whose pass band is located between the frequency 0 and $F/2$ as represented by the full line contour of FIG. 5 for its input resistance thus remains perfectly valid for bandpass filters whose pass band occupies another interval between a multiple of the sampling frequency and the neighbouring odd multiple of half the sampling frequency. Indeed, for all these intervals, the pulse impedance is function of the variable tanh $pT/2$, that is to say that the pulse resistances and reactances are function of the variable $$\tan\frac{wT}{2}$$

and that for these zones, this variable thus passes through all its values from zero ($w=0$) to infinity $$\left(w=\frac{\pi}{T}\right)$$

when the angular frequency passes from zero to the value corresponding to half the sampling frequency.

FIG. 6 represents a part of the circuit of FIG. 1 and more particularly the filter $N_1$ when the latter is a bandpass filter having a characteristic corresponding to that of FIG. 5, in such a way that it can be compensated in the manner indicated above so that its pulse impedance will be purely resistive in the passband, the reactive component being substantially eliminated with the help of a compensating two-terminal reactive network. In FIG. 6, the four-terminal network between terminals 1–1' and terminals 3–3' thus corresponds to $N_1$ of FIG. 1 and it comprises the main four-terminal network $N_{1A}$ which, on one side is directly connected to terminals 1–1', while on the other it is connected to terminals 3–3' by means of a reactive two-terminal network $N_{1B}$ which comprises an anti-resonant circuit LC in series with the capacitor C'. The overall capacitance seen at high frequency at terminals 3–3' of the circuit of FIG. 6 is thus composed of the series combination of the capacitances C, C' and $C_{1A}$ which is that offered by $N_{1A}$. As in the case of the above mentioned concurrent U.S. application, it can be shown that this overall capacitance seen at high frequency at terminals 3–3' must be equal to the ideal value of the capacitance of an ideal low-pass filter whose cut-off frequency is equal to half the sampling frequency as indicated in the above mentioned two articles. In other words, this overall capacitance seen at the terminals 3–3' is equal to half the sampling period divided by the input resistance of the filter $N_{1A}$ in the pass band when it concerns an ideal open circuit single sideband filter and divided by twice this resistance when it concerns the same type of filter but with double sideband.

The remainder of the circuit represented in FIG. 6 is classical. To terminal 3 is connected the series transfer inductance LT. The latter is followed by an electronic gate GT corresponding to switch $S_1$ of FIG. 1, this gate conducting to a multiplex highway HG. As indicated by the multiplying arrow, a pluraltiy of circuits such as represented in FIG. 6 and corresponding for instance to telephone subscribers line circuits can be connected to the same multiplex highway in a time division multiplex electronic switching system.

By virtue of what has been said above in relation to bandpass filters whose cut-off frequencies do not correspond to multiples of half the sampling frequency (FIG. 5), the reactive part of the pulse impedance of such filters in the pass band and which must thus be eliminated by the described compensation can be expressed by $$-\frac{j}{\pi}\log_e\frac{1+b}{1-b}+\frac{j}{\pi}\log_e\frac{b'+1}{b'-1}|b|<1<|b'| \quad (17)$$

where $b'$ is a second transposed normalized variable, this time with respect to the cut-off frequency $f_{c'}$, i.e. it is identified by $$b'=\frac{\tan\frac{wT}{2}}{\tan\frac{w_{c'}T}{2}}=\frac{\tan \pi fT}{\tan \pi f_{c'}T} \quad (18)$$

Indeed, the expression (17) contains, in addition to the term function of $b$ and already appearing in (15), a second term function of $b'$ and which by virtue of the inversion of variables mentioned above, i.e., for $b'$ replaced by $-1/b$, is transformed into this first term function of $b$, i.e. (15).

By using another variable transformation given by $$b''=\frac{1-bb'}{b-b'} \quad (19)$$

it is the whole of the expression (17) this time which is transformed into an expression, function of this new variable $b''$, which is identical to the expression (15):

$$-\frac{j}{\pi}\log_e\frac{1+b}{1-b}+\frac{j}{\pi}\log_e\frac{b'+1}{b'-1}=-\frac{j}{\pi}\log_e\frac{1+b''}{1-b''}|b''|<1 \quad (20)$$

A transformation of variables such as defined by (19) transforms an inductance into a series resonant circuit and a capacitance into an anti-resonant circuit. It results therefrom that if the reactive part of the pulse impedance of a bandpass filter is defined by (17), or alternatively by (20), it will be possible to compensate this reactive part, so that the pulse impedance of the combined filter will be purely resistive in the pass band, by an anti-resonant circuit in the domain of the variable $b''$. This will thus be translated by the combination of a series resonant circuit in shunt with an anti-resonant circuit in the domain of the variables $b$ and $b'$, i.e. in the domain of $$\tan\frac{wT}{2}$$

and also in the domain of the real frequencies $f$. Such a reactive two-terminal network using two inductances and two capacitances is inductive at low frequency and capacitive at high frequency and it can thus also be realized in the form of two anti-resonant circuits in series.

As indicated in FIG. 6, particularly when there is no substantial disparity between the frequency intervals from 0 to $f_{c'}$ on the one hand and from $f_c$ to $F/2$ on the other hand, the reactive compensating two-terminal network $N_{1B}$ can be realized as described above but with the supplementary adjunction of a second compensating inductance L′ which for instance can be branched in shunt across capacitance C′ as indicated in dotted lines.

Relation (13) corresponds to an optimum transmission between a single sideband filter and a double sideband filter. If they are both of this latter type, for instance in a frequency bandwidth transpostion system, one will have for $R_3$ an expression analogous to (8) and $R_3$ will become $2R_3$ in (13).

The characteristics of FIGS. 2 to 5 of course represent ideal conditions which will not be satisfied by practical circuits, especially in the case of the reactive compensating networks such as $N_{1B}$ (FIG. 6) which will be advantageously realized with a restricted number of elements. The circuit L, C, C′ is particularly advantageous in this respect, since it permits to compensate the pulse reactance of a bandpass filter in the pass band with the help of a single inductance. The considerations which precede on the subject of the compensation of the pulse resistance remain however valid if the edges of the characteristics of FIGS. 2 to 5 are not ideally steep, provided that the overall characteristic will be preserved, this with the help of compensating characteristics whose edges are complementary with regard to those of the uncompensated filter.

While the principles of the invention have been described above in connection with specific apparatus, it is to be clearly understood that this description is made only by way of example and not as a limitation on the scope of the invention.

I claim:

1. A resonant transfer network for transferring energy from a pulse source to a terminating source at a sampling frequency rate, said circuit comprising a plurality of filters cascaded between said pulse source and said terminating point, periodically operated series switch means for interconnecting said filters, said plurality of filters comprising at least one double sideband bandpass filter, said double sideband bandpass filter having a passband centered at a particular harmonic of said sampling frequency, said filters having a pulse impedance comprising a reactive part and a resistive part; and said resistive part of said double sideband bandpass filter being substantially equal to twice the input resistance of said double sideband bandpass filter in the passband of said last named filter on the side of said switch means.

2. The resonant transfer network of claim 1 wherein at least one of said filters at the ends of said plurality of filters is a bandpass filter and the sum of said reactive parts of said filter is substantially zero in the passband.

3. The resonant transfer network of claim 2 wherein the said reactive part of each of said filters is substantially zero in the respective passband of the said filters.

4. The resonant transfer network of claim 1 comprising resonant transfer circuit means for connecting one of said filters to said double sideband bandpass filter, said one of said filters being a single sideband filter, and said resistive part being twice the input resistance of said double sideband bandpass filter.

5. The resonant transfer circuit of claim 4 wherein said one of said filters is a second double sideband filter with said resistive part being equal to the input resistance of said double sideband bandpass filter.

6. The resonant transfer network of claim 1 including at least one bandpass filter, and a series reactance branch associated with said bandpass filter to make said last named filter capacitive on the side of said switch means.

7. The resonant transfer network of claim 6 wherein said series reactance branch is capacitive at low frequencies.

8. The resonant transfer circuit of claim 7 wherein said bandpass filter has a first and a second cut-off frequency, said first cut-off frequency being equal to $nF-f_c$ and said second cut-off frequency being equal to $nF+f_c$ where $n$ is equal to any integer including 0, F is equal to the sampling frequency and $f_c$ is less than one-half the sampling frequency.

9. The resonant transfer circuit of claim 8 wherein said second cut-off frequency is equal to $n$F.

10. The resonant transfer circuit of claim 7 wherein said bandpass filter has a first and a second cut-off frequency, said first cut-off frequency being equal to $nF-f_c$ and said second cut-off frequency being equal to $nF-f_{c'}$ where $n$ is equal to any integer including 0, F is equal to the sampling frequency and $f_c$ is less than one-half the sampling frequency and more than $f_{c'}$.

11. The resonant transfer circuit of claim 7 wherein said series reactance branch comprises a first capacitance, a second capacitance and a first inductance bridging said first capacitance.

12. The resonant transfer circuit of claim 7 wherein said series reactance branch comprises two capacitances and two inductances forming two distinct anti-resonant points.

13. The resonant transfer circuit of claim 1 wherein the said double sideband bandpass filter on the side of said switch means has capacitance equal to one-quarter of the sampling period divided by the input resistance of said last named filter in its passband.

References Cited

UNITED STATES PATENTS 3,205,310 9/1965 Schlichte ------------ 179—15

DAVID G. REDINBAUGH, *Primary Examiner.*

ROBERT L. GRIFFIN, *Examiner.*